Feb. 6, 1962 A. J. PARRAGA 3,019,719
INFUSER OF BEVERAGE MAKING MACHINE
Filed Jan. 12, 1960 2 Sheets-Sheet 1

INVENTOR.
ALFREDO J. PARRAGA
BY
ATTORNEY

Feb. 6, 1962  A. J. PARRAGA  3,019,719
INFUSER OF BEVERAGE MAKING MACHINE
Filed Jan. 12, 1960  2 Sheets-Sheet 2

INVENTOR.
ALFREDO J. PARRAGA
BY
ATTORNEY

United States Patent Office 3,019,719
Patented Feb. 6, 1962

3,019,719
INFUSER OF BEVERAGE MAKING MACHINE
Alfredo J. Parraga, Havana, Cuba
(6387 SW. Coral Way, Miami, Fla.)
Filed Jan. 12, 1960, Ser. No. 1,893
9 Claims. (Cl. 99—287)

This invention relates generally to an infuser system for an automatic beverage making machine, and more particularly to improvements in infusers whereby the coffee or other beverage extracted from a dry powder may be obtained more rapidly and with greater efficiency.

The infuser of this invention is an improvement on that disclosed in Patent No. 2,879,811 for Beverage Maker and Dispenser issued to the applicant March 31, 1959, and may be used in place of the infuser shown therein or in other known machines.

The Beverage Maker and Dispenser, forming the subject of the foregoing patent, comprises an endless conveyor intermittently driven to move a plurality of receptacles from station to station. At the first station, the ground coffee, or like dry beverage powder, is fed into a receptacle which is provided with strainer perforations in its bottom. At the second station, an infuser moves downwardly into sealing engagement with the top of the coffee receptacle, hot water and steam are discharged through the infuser into the receptacle where they trickle through the dry coffee and the perforated bottom of the receptacle to a dispensing cup. At a third station the receptacle is cleaned and then returned to the first station.

The described infuser involves flexible steam and water ducts permitting movement with the infuser and separate electrically actuated control valves in these ducts. The present invention substitutes a simplified infuser having a single fixed duct and requiring no electrically operated valve, the structure and operation of the infuser being such as to provide valve and fluid measuring functions. In addition, the mechanical action of the infuser forces the hot fluid through the coffee grounds under considerable pressure, and the need for a separate injection of steam is avoided.

Accordingly, it is a primary object of the present invention to provide an improved infuser for brewing a beverage which operates more rapidly and with greater efficiency.

Another object of the invention is to provide an apparatus of simple construction and less complicated action which nevertheless automatically performs the brewing and infuses the correct amount of fluid to the powder to brew a desired quantity of the beverage.

A further object of the invention is to provide an improved infuser which may be incorporated in beverage making machines of known variety and which may be utilized to simplify their operation and improve their beverage product.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 2:
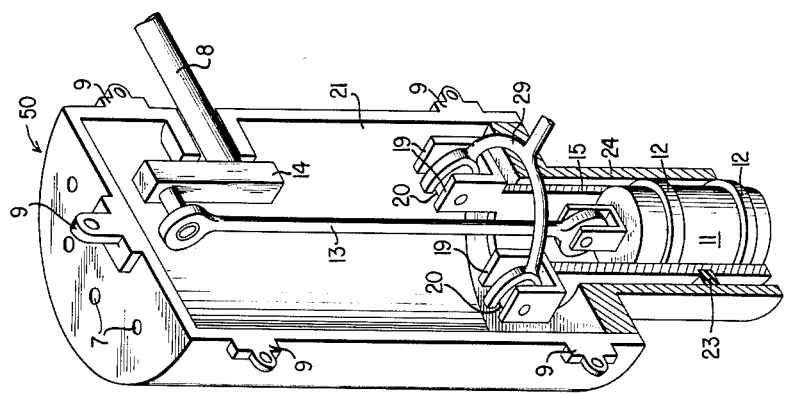
FIG. 2 is an enlarged fragmentary perspective view of the improved infuser with a portion of its support housing removed.
Figure 1:
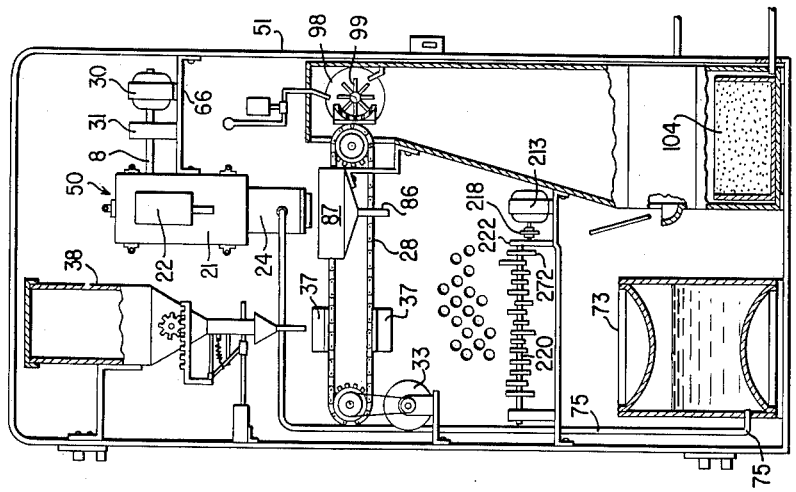
FIG. 1 is an elevational view, partly in vertical section and partly broken away, looking into the front of the cabinet of the apparatus of Patent No. 2,879,811 with the front wall removed and the improved infuser of the present invention substituted for the infuser originally disclosed in the patent.

Referring now more particularly to the drawings, FIG. 1 illustrates a brewing machine constructed according to my prior Patent No. 2,879,811, but modified by substitution of an improved infuser bearing the general reference character 50 and constructed in accordance with the present invention. The construction and mode of operation of the modified apparatus are, in all general respects, similar to those fully explained in the referenced patent and broadly described in preceding paragraphs herein. Therefore, only a brief description of the apparatus shown in FIG. 1 will be included herein to relate the improved infuser to its associated apparatus and to form a basis for understanding of the differences constituting the improvement.

In FIG. 1, the endless conveyor 28, previously mentioned as intermittently carrying the coffee receiving receptacles 37 from station to station, is illustrated as being horizontally mounted in cabinet 51 and driven by motor 33. When the receptacle 37, or strainer, comes to a stop and dwells under hopper 38, a measured portion of ground coffee or similar dry beverage powder is discharged into the strainer. The next dwell station is located in the conduit 87 where the liquid or vapor infusion and brewing take place as will be more fully described hereinafter.

After brewing, the coffee is discharged into conduit 87 and passes by gravity through tube 86 for ultimate filling of a dispensing cup, not shown. The receptacle 37 is then carried by the conveyor to the next dwell station at one end thereof where brush 99 operated by motor 98 forcibly dislodges the spent grounds into the removable waste receptacle 104. In subsequent brewing cycles of the apparatus, the receptacle is carried back on the underside of conveyor 28 and after a number of cycles is again positioned under hopper 38 ready for re-use.

The improved infuser 50, as will be noted in FIGS. 2–5, constitutes essentially a pump fixedly mounted over conduit 87 and the conveyor 28 by means of a bracket 66, FIG. 1, extending from and secured to the wall of cabinet 51. The pump comprises a cylindrical housing or support member 21 preferably made in two semicylindrical parts bolted or otherwise secured together at lugs 9. A separate, one piece, cylindrical extension 24 is suitably secured to and depends from the bottom of the support 21 and communicates with the interior thereof. The extension 24 forms essentially a pump body or barrel and is provided with a hot water inlet 88 which is connected by a fixed duct 75 with the boiler 73. It will be understood that alternatively inlet 88 may be so connected as to feed steam or a mixture of steam and hot water, or other heated fluid to the pump.

A fluid receiving skirt 15 of tubular shape is mounted for vertical, intermittent reciprocating movement in the pump barrel or extension 24. An orifice 25, or port, is formed through the skirt wall which in one position of the skirt aligns with the inlet 88 to permit passage of fluid into the skirt. A pair of flexible sealing rings 23 are carried by the skirt, one above and the other below the port 25, and engaging the wall of the extension 24 to form a passage between the inlet 88 and the orifice 25.

The lower end of the skirt 15 is partially closed by a perforated plate 16. Surrounding this end, exteriorly of plate 16 and slightly elevated thereabove, is a ring 17 carrying a gasket 18. In the lower position of skirt 15, gasket 18 engages the rim of the coffee strainer 37 with a tight sealing fit at the second or infusing station while the plate 16 enters the strainer to press down the ground coffee.

The upper end of the skirt 15 is open and provided with two small wheels 20 which may be grooved if desired. Each wheel is mounted between a pair of ears 19 to serve as a knee to one tine of the forked lever 29 which is pivoted at 32 to the wall of support 21. The lever 29 is slotted at its other end and actuated by a double winding solenoid 22 to raise and lower the skirt 15. Preferably, the solenoid 22 is attached to the exterior of the support housing 21.

A piston 11 is provided for intermittent reciprocating motion within the intermediate skirt 15. The stroke of the piston is governed by the connecting rod 13 pivotally secured to the top of the piston at one end and pivotally secured to the crank pin of an eccentric 14 at the other end. The eccentric 14 is turned by shaft 8 which enters support housing 21 through a bearing collar and is turned by motor 30 through the speed reducer 31, FIG. 1. Piston 11 is also provided with upper and lower rings 12 for sealing engagement with the interior of skirt 15.

A chamber 26 is formed in the interior of the skirt 15 between the perforated plate 16 and the piston 11 when the skirt is in its lowermost position pressing against the strainer 37 and the piston 11 has not moved. A groove or channel 27 longitudinal of the skirt 15 runs from its upper end to about the level of port 25 at the top of chamber 26. The groove serves to vent air from chamber 26 when the boiling water is entering and avoids counterpressure. The vented air escapes into housing 21 and from thence exhausts through openings 7 in its top wall.

Figure 3:
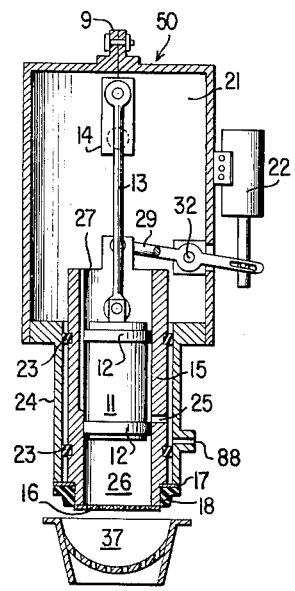
FIG. 3 is a reduced elevational view, partly in vertical section showing the infuser parts in position to start a brewing operation.

FIG. 3 illustrates the positions of the various infuser parts when the infuser or pump is inoperative but ready to begin the infusion. It will be noted that both the piston 11 and skirt 15 are in the elevated positions so that a strainer 37 is free to move under them carried by the conveyor. The port 25 and inlet 88 are offset from each other and the rings 12 and 23 effectively seal against entrance of boiling water into skirt chamber 26. Thus, the piston and skirt together act as a valve to close the inlet 88.

Figure 4:
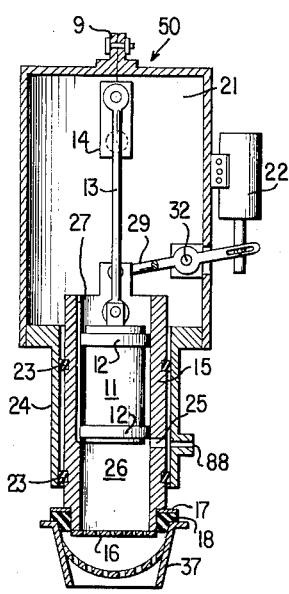
FIG. 4 is a view similar to FIG. 3 illustrating the positioning of various infuser parts in the first step of the fluid infusion.

In FIG. 4, the skirt 15 has been moved by operation of solenoid 22 to its lowest position pressing the plate 16 against the coffee grounds in strainer 37. The strainer is sealed by gasket 18. Boiling water is free to enter chamber 26 since openings 25 and 88 are aligned and unblocked by the piston 11 which is still in elevated position. Thus, a measured quantity of hot fluid enters chamber 26 governed by its size and the time during which the openings 25 and 88 remain in alignment.

Figure 5:
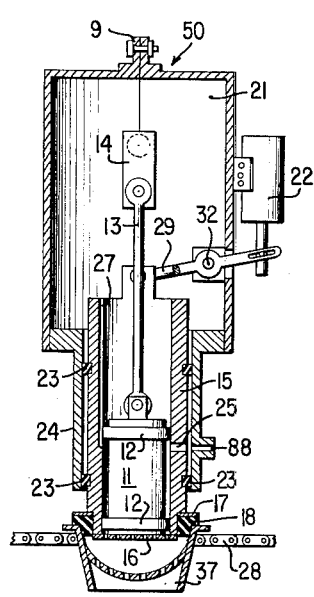
FIG. 5 is a view similar to FIG. 4 illustrating the positioning of various infuser parts at the end of the infusion.

In FIG. 5 the piston 11 has been moved to its lowermost position by operation of motor 30 forcibly expelling the liquid in skirt chamber 26 and through the coffee grounds in strainer 37 with great pressure. This action not only completes the brewing and forces the brew out of the strainer toward the dispensing cup, but also closes port 25 against entrance of more liquid into the skirt chamber. Following this action, both the piston and the skirt are elevated to their positions shown in FIG. 3 wherein the liquid inlet openings are closed by the piston and skirt, and the infuser is ready for the next brewing.

Figure 6:
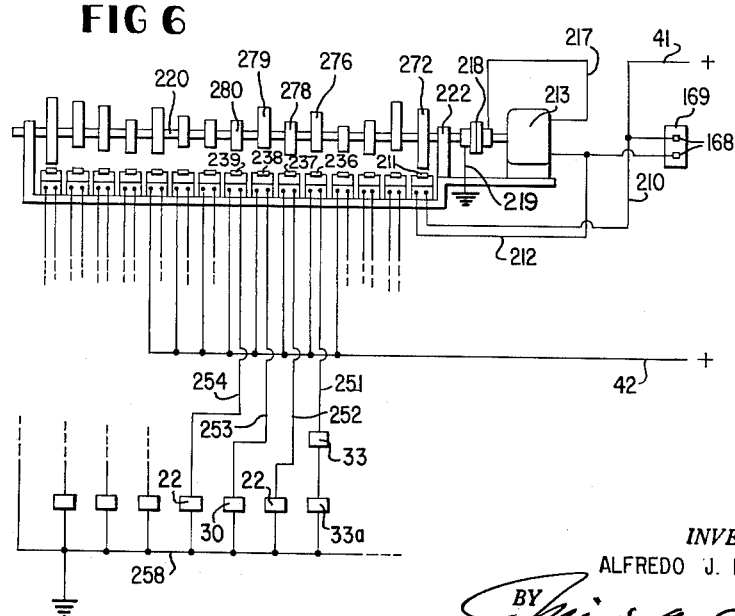
FIG. 6 is a fragmentary circuit diagram of the wiring involved in operation of the infuser in a machine similar to that of prior Patent 2,879,811.

In FIG. 6 is diagrammed a portion of the circuit shown, and fully explained, in Patent No. 2,879,811 modified to operate the improved infuser described herein. The operation of the brewing machine is controlled by a shaft 220 mounting a plurality of cams of which only cams 272, 276, 278, 279 and 280 are referenced. The shaft 220 is coupled to the shaft of a motor 213 through a magnetic clutch 218 and reduction gearing 222. A coin dropped into box 169 will energize motor 213 by closing contacts 168 momentarily through the following circuit: the positive side of an electric source, wire 41, switch 168, windings of motor 213, wire 217, clutch 218, wire 219 to ground. Once the motor starts to turn shaft 220, cam 272 closes switch 211 which establishes a holding circuit to maintain operation of motor 213 until the shaft makes one complete revolution. This holding circuit comprises the positive side of the source, wire 41, wire 210, switch 211, wire 212, motor 213, wire 217, clutch 218 and wire 219 to ground.

The various cams on shaft 220 are shaped to close and open, in the proper time sequence, additional individual switches of which, in addition to switch 211, only 236, 237, 238 and 239 are referenced. These switches control various elements of the brewing machine. For example, cam 276 closes the switch 236 for energizing the motor 33, and its clutch and brake means 33a, after release of ground coffee to the strainer receptacle. Motor 33 operates the conveyor 28 to move the receptacle to the second station in conduit 87, FIG. 1. The motor and conveyor energizing circuit is from + source, through wire 42, switch 236, wire 251, motor 33, clutch 33a, wire 258 to ground. The motor 33 moves the conveyor 28 until the strainer reaches the second station at which time cam 276 moves out of engagement with the switch 236 to break the circuit to motor 33.

Similarly, a cam 278 closes the switch 237 to energize one winding of solenoid 22 through leads 252 and 258 and wire 42. This lowers the intermediate skirt 15 from its position in FIG. 3 to that of FIG. 4 and hot water is admitted to the skirt and strainer. At the proper time thereafter, to allow for filling the skirt with the required amount of water, cam 279 closes switch 238 to energize motor 30 through its leads 253 and 258. This lowers piston 11 to its position as in FIG. 5 to expel the hot fluid from the skirt 15 and through the coffee grounds, as previously explained. Without stopping, piston 11 starts back toward its initial position of FIG. 3 at which time, cam 280 closes switch 239 to energize the second winding of solenoid 22 through its leads 254 and 258. Operation of solenoid 22 in the reverse direction raises the skirt 15 from the strainer 37 and elevates the skirt from its position of FIG. 5 to that of FIG. 3. Cam 279 is shaped to open switch 238 when piston 11 reaches its uppermost position. Other cams operate to close and open switches and complete the entire brewing and dispensing cycle as set forth in Patent No. 2,879,811.

It will be noted that although the improved infuser is less complicated and functions in a simpler way, its control elements, solenoid 22 and motor 30, are wired to the same switches 237—239 and are controlled by the same cams 278—280 as utilized in the patent. Thus, no radical changes are required in the wiring of the original device to substitute the improvement.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. In an automatic beverage making machine having a strainer receptacle carried by an endless support, means for intermittently moving said support to advance said strainer receptacle between loading, infusing and discharging stations, and an infuser at said infusing station and comprising a support member having a hot water inlet, a tubular water receiving skirt mounted for intermittent reciprocating movement in said support between an initial inlet closing position and a liquid receiving and feeding position wherein said strainer receptacle when in said infusing station is adapted to receive liquid from the skirt, a port in the wall of said skirt, adapted to align with said hot water inlet in the liquid receiving and feeding position of the skirt, and a piston mounted in said skirt intermittently reciprocally movable to close said port and expel liquid from the skirt into said strainer receptacle when said skirt is in liquid feeding position.

2. An infuser according to claim 1 wherein said skirt and said piston are each provided with a piston ring for sealing against escape of liquid.

3. An infuser according to claim 1 wherein said skirt is provided with a groove in its internal wall from one end to a level near said port for bleeding air from the interior of the skirt upon entrance of liquid therein.

4. An infuser according to claim 1 wherein said skirt is provided with an air bleed opening to permit more ready entrance of liquid therein through said port.

5. In an automatic beverage making machine having a strainer receptacle carried by an endless support, means for intermittently moving said support to advance said strainer receptacle between loading, infusing and discharging stations, and an infuser at said infusing station and comprising a support member having an inlet for heated fluid, a tubular fluid receiving skirt movable in said support to a fluid ejection position wherein said strainer receptacle when in said infusing station is adapted to receive fluid from the skirt, said skirt having a port for alignment with said inlet, a piston movable in said skirt, and means for intermittently reciprocating said piston and said skirt with respect to each other and said support member.

6. An infuser according to claim 5 wherein said means for reciprocating the piston and skirt comprises a fulcrumed lever connected to said skirt and a solenoid for moving said lever.

7. An infuser according to claim 6 wherein said means for reciprocating the piston and skirt further comprises a crank turned by an electric motor and a rod pivotally connecting said crank to said piston.

8. An infuser according to claim 5 in combination with electrically operated cam means for operating said means for intermittently reciprocating said piston and skirt in proper sequence and time in a beverage making cycle.

9. In an automatic beverage making machine, the combination according to claim 5 wherein the rim of said skirt when in said fluid ejection position engages the rim of said strainer receptacle in sealing engagement.

References Cited in the file of this patent
UNITED STATES PATENTS 2,879,811     Parraga _____ Mar. 31, 1959